(12) United States Patent
Urisu

(10) Patent No.: US 8,072,545 B2
(45) Date of Patent: Dec. 6, 2011

(54) TELEVISION AND IMAGE DISPLAY DEVICE IN WHICH COLOR SATURATION CAN BE ADJUSTED

(75) Inventor: Takayoshi Urisu, Osaka (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 1117 days.

(21) Appl. No.: 11/901,183

(22) Filed: Sep. 14, 2007

(65) Prior Publication Data

US 2008/0068506 A1 Mar. 20, 2008

(30) Foreign Application Priority Data

Sep. 19, 2006 (JP) ................................. 2006-252690

(51) Int. Cl.
*H04N 5/57* (2006.01)
*H04N 9/64* (2006.01)
*H04N 5/14* (2006.01)
*H04N 5/00* (2011.01)

(52) U.S. Cl. ......... 348/603; 348/703; 348/577; 348/617

(58) Field of Classification Search .................. 348/560, 348/62, 571, 577, 603, 612, 617, 703, 708, 348/720, 728

See application file for complete search history.

(56) References Cited

U.S. PATENT DOCUMENTS

| | | | |
|---|---|---|---|
| 5,452,017 A | 9/1995 | Hickman | |
| 5,691,779 A * | 11/1997 | Yamashita et al. | ............ 348/645 |
| 7,593,066 B2 * | 9/2009 | Zhu | ............................... 348/645 |
| 2005/0099546 A1 | 5/2005 | Zhu | |
| 2006/0082686 A1 * | 4/2006 | Lee et al. | ...................... 348/645 |

FOREIGN PATENT DOCUMENTS

| | | |
|---|---|---|
| JP | 05-183946 | 7/1993 |
| JP | 06-006838 | 1/1994 |
| JP | 06-339017 | * 12/1994 |
| JP | 08-129369 | 5/1996 |
| JP | H08-298627 A | 11/1996 |
| JP | 2001-103505 | 4/2001 |
| JP | 2001-285658 A | 10/2001 |
| JP | 2004-199376 | * 7/2004 |
| JP | 2005-057543 A | 3/2005 |

OTHER PUBLICATIONS

The extended European search report, pursuant to Rule 62 EPC dated Sep. 4, 2008, searched on Aug. 27, 2008.
Japanese Notice of the reason for refusal, dated Oct. 1, 2008.

* cited by examiner

*Primary Examiner* — Hoang-Vu A Nguyen-Ba
(74) *Attorney, Agent, or Firm* — Yokoi & Co., U.S.A., Inc.; Toshiyuki Yokoi

(57) ABSTRACT

The present invention discloses an image display device, comprising: a lookup table specifying a corresponding relationship between color saturation represented by gradation and set values associated with part including the minimum value of the color saturation; a first color saturation setting unit for setting color saturation associated with the set value greater than or equal to a predetermined value based on the lookup table; and a second color saturation setting unit for setting color saturation associated with the set value less than the predetermined value by calculating values which gradually decreased to the minimum value of the color saturation as the set value decreases.

15 Claims, 8 Drawing Sheets

| SET VALUE | REGISTER VALUE | REGISTER VALUE (AT OFFSET OF ZERO) |
|---|---|---|
| 14 MAX | 200+OFFSET | 200 |
| 13 | 196+OFFSET | 196 |
| 12 | 192+OFFSET | 192 |
| 11 | 188+OFFSET | 188 |
| 10 | 184+OFFSET | 184 |
| 9 | 180+OFFSET | 180 |
| 8 | 176+OFFSET | 176 |
| 7 | 172+OFFSET | 172 |
| 6 | 168+OFFSET | 168 |
| 5 | 164+OFFSET | 164 |
| 4 | 160+OFFSET | 160 |
| 3 | *1 | 120 |
| 2 | *2 | 80 |
| 1 | *3 | 40 |
| 0 MIN | 0 | 0 |

*1 3×[STEP4−STEP0]/4
*2 2×[STEP4−STEP0]/4
*3 1×[STEP4−STEP0]/4

FIG.3

| SET VALUE | | REGISTER VALUE | REGISTER VALUE (AT OFFSET OF ZERO) |
|---|---|---|---|
| 14 | MAX | 200+OFFSET | 200 |
| 13 | | 196+OFFSET | 196 |
| 12 | | 192+OFFSET | 192 |
| 11 | | 188+OFFSET | 188 |
| 10 | | 184+OFFSET | 184 |
| 9 | | 180+OFFSET | 180 |
| 8 | | 176+OFFSET | 176 |
| 7 | | 172+OFFSET | 172 |
| 6 | | 168+OFFSET | 168 |
| 5 | | 164+OFFSET | 164 |
| 4 | | 160+OFFSET | 160 |
| 3 | | *1 | 120 |
| 2 | | *2 | 80 |
| 1 | | *3 | 40 |
| 0 | MIN | 0 | 0 |

*1  3×[STEP4−STEP0]/4
*2  2×[STEP4−STEP0]/4
*3  1×[STEP4−STEP0]/4

FIG.7

| SET VALUE | | REGISTER VALUE |
|---|---|---|
| 14 | MAX | 200 |
| 13 | | 196 |
| 12 | | 192 |
| 11 | | 188 |
| 10 | | 184 |
| 9 | | 180 |
| 8 | | 176 |
| 7 | | 172 |
| 6 | | 168 |
| 5 | | 164 |
| 4 | | 160 |
| 3 | | 154 |
| 2 | | 150 |
| 1 | | 142 |
| 0 | MIN | 0 |

PRIOR ART

_US 8,072,545 B2_

TELEVISION AND IMAGE DISPLAY DEVICE IN WHICH COLOR SATURATION CAN BE ADJUSTED

CROSS-REFERENCES TO RELATED APPLICATIONS

The present application is related to the Japanese Patent Application No. 2006-252690, filed Sep. 19, 2006, the entire disclosure of which is expressly incorporated by reference herein.

BACKGROUND OF THE INVENTION (1) Field of the Invention

The present invention relates to a television and an image display device, and in particular, to a television and an image display device in which color saturation can be adjusted.

(2) Description of Related Art

In an image display device such as a television, a user can perform various color corrections of picture quality (color density, luminance, brightness and so forth) to obtain a display suiting users' taste because the color and brightness of images vary with image sources. A recent digitization tends to perform the various color corrections using digital technique. It is common to set the quantity of adjustment for color corrections into a register as a set value when a digital color correction is performed.

In a television, for example, an eight-bit register is used to set adjustment values for color corrections, enabling 256 gradations (a variable range) to be adjusted. However, a user tends to prefer a deep-color picture quality in a recent television, so that an adjustment value for color density (color saturation) tends to deviate to a high density side as a whole. In other words, as shown in FIG. 7, a number of adjustable gradations provided for a user is only 68 of 0 and 142 to 200 (a range in which gradation can be set), in addition, only 14 extracted from the 68 gradations are associated with the set values, so that a user can select only gradations associated with the set values.

The following are known as related art on color-density setting: a color correction circuit in which color density is adjusted by digital signal processing not to cause color collapse (for example, Japanese Patent Application Laid-Open No. 2001-103505); a color adjusting circuit in which a synthesizing ratio of each signal of RGB to a luminance signal is changed to continuously adjust color density from color image to monochrome image (for example, Japanese Patent Application Laid-Open No. 08-129369); a color circuit adjusting device capable of adjusting a color circuit without using an SMPTE color bar pattern generator (for example, Japanese Patent Application Laid-Open No. 06-6838); and an on-screen display device guiding procedures for picture quality adjustment (for example, Japanese Patent Application Laid-Open No. 05-183946).

In the above, color is deleted at a minimum value (zero in FIG. 7). That is to say, as illustrated in FIG. 8, when color density is gradually reduced by a user, the color density changes at a substantially constant ratio until one step before the minimum value and is reduced to zero at the minimum value to turn into a monochrome display. Even if color density is thus set and if adjustment values associated with a plurality of set values are distributed throughout a plurality of adjustment values (throughout 0 to 256 gradations), a user will not feel odd.

A recent trend in user's taste for deep colors causes the distribution of set values to deviate to a high density side as a whole, producing a large change between the minimum value and one step before the minimum value, which causes a user to feel odd. Furthermore, 0 to 142 gradations on the lower density side out of 256 gradations are not allowed to be set by a user, which cannot suit the taste of users who are fond of a light color.

BRIEF SUMMARY OF THE INVENTION

The present invention discloses an image display device, comprising: a lookup table specifying a corresponding relationship between color saturation represented by gradation and set values associated with part including the minimum value of the color saturation; a first color saturation setting unit for setting color saturation associated with the set value greater than or equal to a predetermined value based on the lookup table; and a second color saturation setting unit for setting color saturation associated with the set value less than the predetermined value by calculating values which gradually decreased to the minimum value of the color saturation as the set value decreases.

These and other features, aspects, and advantages of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and not as a definition of the limits of the invention. Throughout the disclosure, the word "exemplary" is used exclusively to mean "serving as an example, instance, or illustration." Any embodiment described as "exemplary" is not necessarily to be construed as preferred or advantageous over other embodiments.

Referring to the drawings in which like reference character(s) present corresponding parts throughout:

FIG. 3 is examples of a lookup table and formulas;

FIG. 7 is an exemplary lookup table in the related art; and

DETAILED DESCRIPTION OF THE INVENTION

The detailed description set forth below in connection with the appended drawings is intended as a description of presently preferred embodiments of the invention and is not intended to represent the only forms in which the present invention may be constructed and/or utilized.

For purposes of illustration, programs and other executable program components are illustrated herein as discrete blocks, although it is recognized that such programs and components may reside at various times in different storage components, and are executed by the data processor(s) of the computers.

An embodiments of the present invention will be described in the following order.

(1) Schematic configuration of television
(2) Setting adjustment values of color saturation (color density)
(3) Modifications
(4) Conclusion (1) Schematic Configuration of Television A liquid crystal television 100 in which the image display device of the present invention is embodied is described with reference to the drawings. Although the liquid crystal television is taken as an example in the description of the present embodiment, the present invention is applicable to any image display device such as a plasma television, projector device and liquid crystal display in which the picture quality of video signals is adjusted by digital technique to display pictures on a screen.

Figure 1:
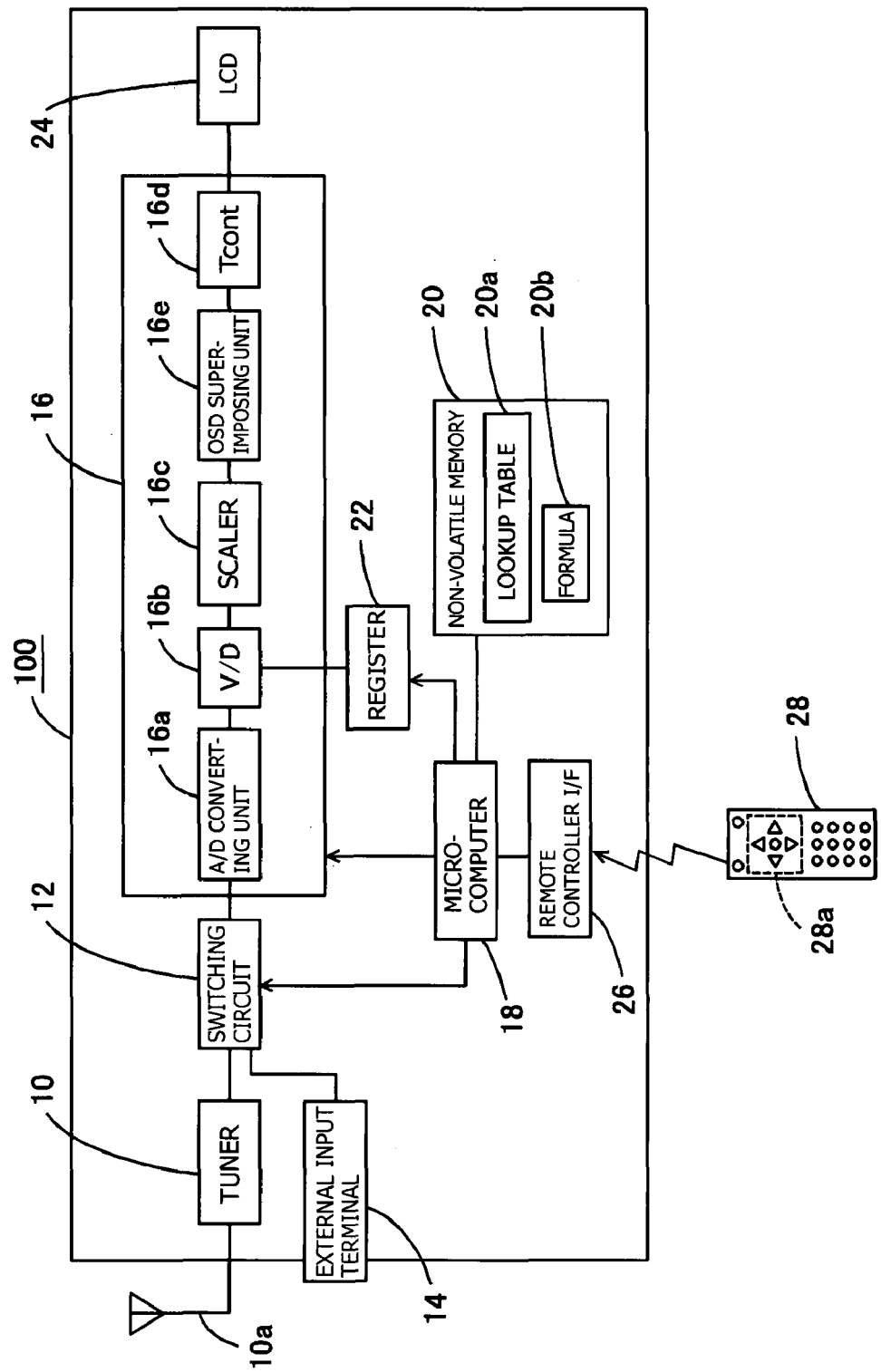
FIG. 1 is an exemplary schematic block diagram showing configuration for a liquid crystal television.

FIG. 1 is an exemplary schematic block diagram showing configuration for the liquid crystal television 100. The liquid crystal television 100 mainly includes a tuner 10, external input terminal 14, switching circuit 12, video signal processing IC 16, microcomputer 18, non-volatile memory 20, register 22, liquid crystal display (LCD) 24, remote controller I/F 26 and remote controller 28. The video signal processing IC 16 mainly includes an Analog to Digital (A/D) converting unit 16a, video decoder (V/D) unit 16b, scaler 16c, timing controller (Tcont) 16d and on-screen display (OSD) superimposing unit 16e.

The tuner 10 receives a television broadcast signal through an antenna 10a. The tuner 10 outputs a composite signal being an analog video signal based on the received television broadcast signal. The liquid crystal television 100 includes an external input terminal 14 being a terminal for receiving a video signal from an external equipment. The external input terminal 14 corresponds to terminals such as a composite terminal or component terminal.

The tuner 10 and external input terminal 14 are connected to the switching circuit 12 to select any one of composite signals output from the tuner 10 and external input terminal 14. This selection is performed by a remote control signal input into the switching circuit 12 thorough the remote controller I/F 26 connected to the microcomputer 18 and by a control panel (not shown). The composite signal selected by the switching circuit 12 is input into the video signal processing IC 16.

The composite signal input into the video signal processing IC 16 is analog-to-digital converted by the A/D converting unit 16a. Then, the video decoder 16b decodes three primary RGB signals from the digital video signal. The video decoder 16b separates a video signal from an audio signal and outputs the separated audio signal to an audio signal processing unit (not shown) to cause a loudspeaker to output audio signals. The video decoder 16b obtains adjustment values set in a plurality of registers including the register 22, subjects the RGB video signals to a picture quality adjusting process such as color saturation (color or color density), contrast, TINT, brightness, color adjustment such as skin color correction, monochrome expansion, delay, sharpness, gamma correction and noise reduction and outputs the video signals to the scaler 16c. The scaler 16c converts continuous interlaced video signals into progressive video signals, subjects the input digital video signals to scaling process so that the digital video signals meet a number of pixels (aspect ratio of m:n) of the screen of the LCD 24 to produce image data for one screen to be displayed on the LCD 24 and outputs the produced image data to the OSD superimposing unit 16e. The OSD superimposing unit 16e produces OSD signals corresponding to various displays based on data such as control signals and character information output from the microcomputer 18, superimposes the OSD signals on video signals and outputs the signals to the Tcont 16d. This produces image data on which still images are superimposed on the video signals based on data such as character information. Needless to say, if OSD display is not required, it is allowed to bypass the OSD superimposing unit. The Tcont 16d drives the pixels of the LCD 24 formed by arranging pixels based on the input image data to display images on the screen of the LCD 24 according to the image data.

The microcomputer 18 includes a ROM and a RAM which are not shown, reads out various control programs stored in the ROM, executes the programs with the RAM as a work area and controls the circuits of the liquid crystal television. The microcomputer 18 properly accesses the non-volatile memory 20 to read out a necessary data to be used for control.

The register 22 is a high speed storage device temporarily stores computing data and computed results of the microcomputer 18. In the present embodiment, adjustment values of color saturation are set into the register 22. The register 22 is capable of setting adjustment values at eight bits and 256 gradations of color saturation and of designating 256 segmented dynamic range (variable range) of color saturation which can be displayed on the LCD. Needless to say, the liquid crystal television 100 has registers into which adjustment values for picture quality except for color saturation are set. The present invention may be applied to these registers.

The non-volatile memory 20 in which information can be rewritten uses a semiconductor memory or ferroelectric memory. A magnetic storage device such as a hard disc drive and the like may be used as a non-volatile memory if information therein is not erased when power supply is turned off. The non-volatile memory 20 stores information corresponding to adjustment values of RGB colors to which the microcomputer 18 refers when setting data into the register 22. Any information may be used as the information as long as it represents adjustment values of RGB colors, IQ signal of color signal or mixture ratio of RGB colors. Specifically, the non-volatile memory 20 stores the lookup table 20a in which any of gradations representing color saturation by 256 gradations is associated with the set values of 0 and 4 to 14 and formulas 20b for calculating gradations of the set values of 1 to 3.

The remote controller 28 includes a plurality of keys to receive operations and a transmitting unit for transmitting remote controlling signals to the remote controller I/F 26 and transmits the remote control signals according to operations of a plurality of keys. For example, when the microcomputer 18 receives the remote control signals representing channel selection through the remote controller I/F 26, the microcomputer 18 transmits frequency data to the tuner 10 to cause the tuner to receive television signal of a corresponding channel. When the microcomputer 18 receives the remote control signal corresponding to a cursor key 28a formed of a cursor moving key and a cursor selection key at a menu screen for performing various settings, the microcomputer 18 receives inputs for selecting the move of the cursor or items displayed with the cursor.

(2) Setting Adjustment Values of Color Saturation

Adjustment values of color saturation are set into the register 22 by the microcomputer 18 and the video decoder 16b obtains the adjustment values set into the register 22 to perform color correction corresponding to the adjustment values. A user selects operating items for adjusting color saturation from the menu screen for performing various settings to display adjustment screen of color saturation and sets adjustment values on the screen, thereby a user can adjust color saturation.

Figure 2:
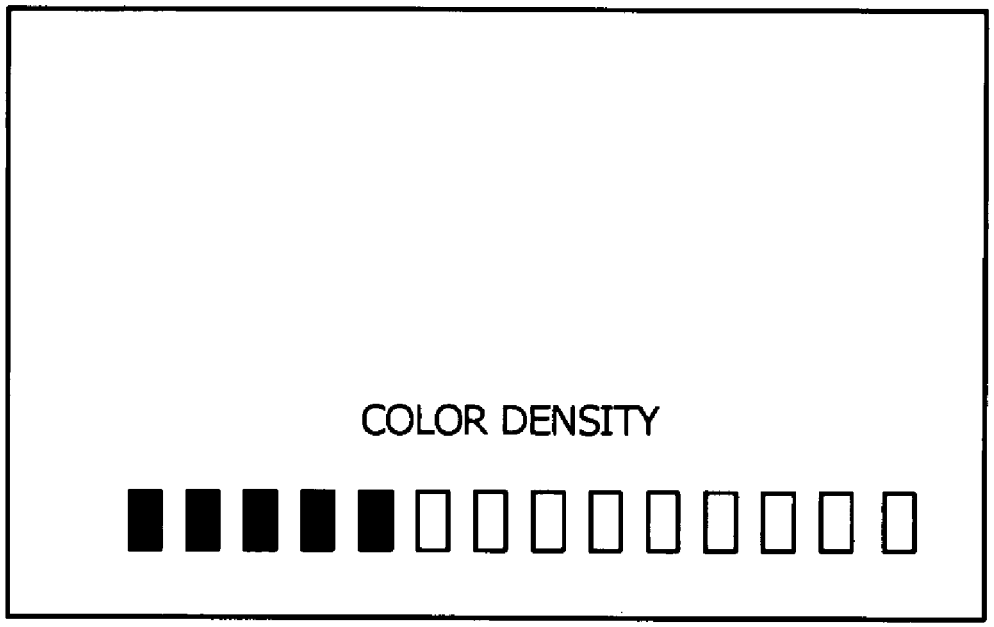
FIG. 2 is an example of a screen for adjusting color saturation.

FIG. 2 shows one example of the adjustment screen of color saturation. The figure shows 14 scales arranged in the left and the right direction and the scales correspond to set values. In the figure, color gradually becomes lighter as the scale moves to the left and color gradually becomes deeper as the scale moves to the right. The left end of the scale is zero and color saturation is also zero, that is, monochrome is displayed. In the figure, since five scales on the left are selected, color saturation is five. In other words, the user can select 15 set values of color saturation among 0 to 14 values. It is to be understood that a number of set values are arbitrary and various set values may be selected. However, the adjustment value corresponding to the smallest scale uses a zero. Selecting this scale never fails to display monochrome being a color saturation of zero.

Figure 4:
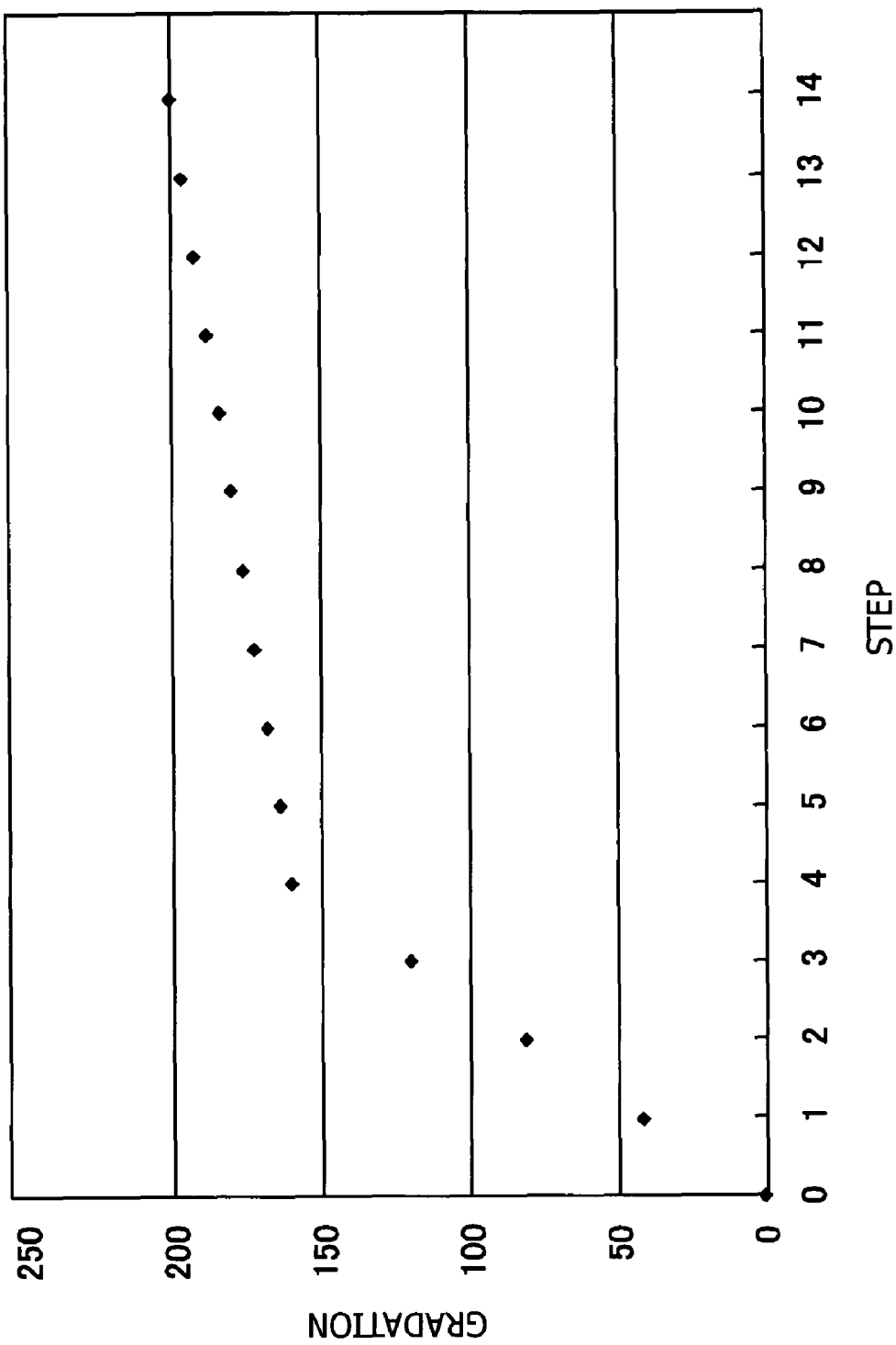
FIG. 4 is an exemplary graph of register values calculated by the lookup table and formulas in FIG. 3 (where offset is zero)

FIG. 3 is examples of a lookup table 20a and formulas 20b. FIG. 4 is an exemplary graph of register values (adjustment values) calculated by the lookup table and formulas in FIG. 3, where offset is zero. In the present embodiment, the dynamic range of color saturation is divided into 256 segments to represent gradations, thereby causing gradations to correspond, one to one, to register values. The register values corresponding to set values of 4 to 14 are unevenly distributed in register values of 127 or more being the intermediate value between the maximum and the minimum value. A set value of 4 corresponds to a predetermined value.

The lookup table 20a specifies a corresponding relationship between set values of 4 to 14 and the register values. The register values are fixed values. The fixed values are expressed as a basic value+an offset value. The same offset value is set for set values of 4 to 14 for each of models of the liquid crystal television 100 and for each of destinations. That is to say, in the present embodiment, the set values of 4 to 14 and the resister values corresponding thereto form the lookup table.

The formulas *1 to *3 are applied to the set values 1 to 3. The formula *1 is expressed by 3×([register value of set value 4]−[register value of set value 0])/4. The formula *2 is expressed by 2×([register value of set value 4]−[register value of set value 0])/4. The formula *3 is expressed by 1×([register value of set value 4]−[register value of set value 0])/4. Generalizing these formulas provides the following formula expressed by a set-value number to be calculated×([register value of the predetermined value]−[register value of set value of 0])/[set-value number of the predetermined value]. In other words, formulas *1 to *3 or the general formula form the formula in the present embodiment.

Specifically, if an offset value is taken to be zero, the register values corresponding to the set values of 0 to 14 are 0, 40, 80, 120, 160, 164, 168, 172, 176, 180, 184, 188, 192, 196 and 200. That is, the register values corresponding to the set values of 4 to 14 increase approximately proportional to the increase in the set-value number and the register values corresponding to the set values of 0 to 3 decrease to the lower limit (0) of the register value as the set-value number decreases based on the lookup table and formulas in FIG. 3.

Figure 5:
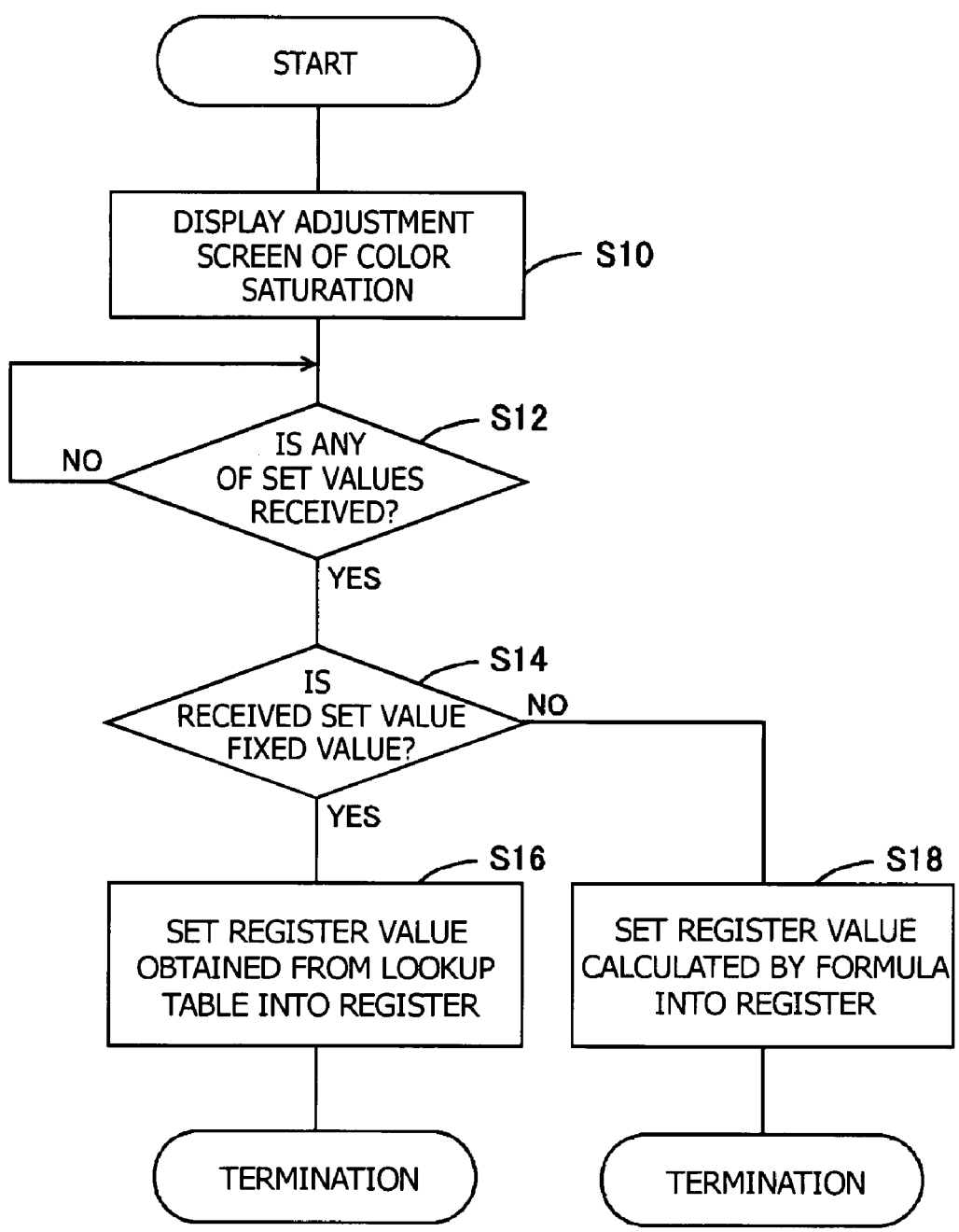
FIG. 5 is an exemplary flow chart showing the process of a microcomputer setting color saturation on the screen for adjusting color saturation.

The following is a description of microcomputer processes for setting color saturation on the screen for adjusting color saturation with reference to FIG. 5. The processes are executed when operation items are selected to adjust color saturation from the menu screen for performing various settings.

When the process is started, an adjustment screen for color saturation as shown in FIG. 2 is displayed at step S10. The microcomputer 18 acquires information representing the adjustment screen of color saturation and the present set value of color saturation from the non-volatile memory 20. The microcomputer 18 causes the OSD superimposing unit 16e to produce OSD signals for displaying the present set value of color saturation on the adjustment screen of color saturation, superimpose the produced OSD signals on the image data from the scaler 16c and supply the image data on which the OSD signals are superimposed to the Tcont 16d. Then, the Tcont 16d drives the LCD 24 based on the image data on which the OSD signals are superimposed to display corresponding pictures on the screen of the LCD 24.

At this point, a user can change set values and determine the changed set value by depressing and operating the operation key arranged on the remote controller 28. At step S12, a determination is made as to whether any of the set values is received. If a set value is received, it is determined that the condition is satisfied and then the process advances to step S14. If a set value is not received, it is determined that the condition is not satisfied and then the step S12 is repeated. The microcomputer 18 detects a key operation in response to the input of a voltage signal from the remote controller I/F 26 to receive an operational input from the remote controller 28. For example, when the microcomputer 18 detects the operation of the cursor moving key, the microcomputer 18 causes the OSD superimposing unit 16e to produce OSD signals whose set values are changed and superimpose the OSD signals on image data to repeat the step S12. When the microcomputer 18 detects the operation of the cursor selection key, the microcomputer 18 receives the set value which is being displayed and stores it in the non-volatile memory 20, and the process proceeds to step S14.

At step S14, a determination is made as to whether the register value corresponding to the received set value is a fixed value. If the received set value is 0 or 4 to 14, it is determined that the condition is satisfied and then the process proceeds to step S16. If the received set value is 1 to 3, it is determined that the condition is not satisfied and then the process proceeds to step S18. That is to say, if the received set value is associated with the fixed register value by the lookup table 20a, it is determined that the condition is satisfied. If the received set value needs a register value calculated by the formula, it is determined that the condition is not satisfied.

At step S16, the microcomputer accesses the lookup table 20a to obtain the register value corresponding to the received set value, sets the obtained register value into the register 22 and terminates the process. On the other hand, at step S18, the received set-value number, the register value 160 at the set value 4, the register value 0 at the set value 0 and the set-value number 4 of the set value 4 are substituted into the formula 20b to calculate a register value to set the calculated register value into the register 22 and then the process is terminated. Then, the video decoder 16b accesses the register 22 to gain the register value, adjusts picture quality to color saturation based on the register value and outputs to the scaler 16c.

The microcomputer 18 executing the processes of the steps S10, S12, S14 and S16 forms a first color saturation setting unit. The microcomputer 18 executing the processes of the steps S10, S12, S14 and S18 forms a second color saturation setting unit.

Incidentally, set values used for calculating a register value by the formula are not limited to set values 1 to 4, they may be the set values, for example, 1 to 5 or 1 to 3. The set values applied to the formula are selected out of any of the set values from the set value 1 to shipment position (set value in shipment) or less so that difference between color saturations calculated from adjacent set values in the formula is equal to a predetermined value or less. The shipment position refers to a set value which is set in shipment and with which the most standard color saturation is associated. In other words, applying the formula to the set values above the shipment position affects color saturation in the shipment position, which does not enable setting color saturation suiting the most users' taste.

A formula is not limited to the above one, but various formulas may be used. Any formula may be used as long as it causes register values to gradually decrease from the register value of the set value being a predetermined value to the register value of zero being the lower limit. There are various formulas such as a linear function, quadratic function, functions higher in order than a quadratic function, exponential function, logarithmic function and combination thereof. It is preferable to use a formula that calculates a register value which does not cause a user to feel odd with change in color saturation between the set values.

(3) Modifications

In the above embodiment, although the register values of set values are calculated by the formula 20b, even if the register values are set by a user, the purpose of the present invention can be achieved. That is to say, a user can set a register value from any of set values not more than a shipment position to the set-value number 1, select a set value which does not cause the user to feel odd and produce a set value associated with a register value lighter in color.

Figure 6:
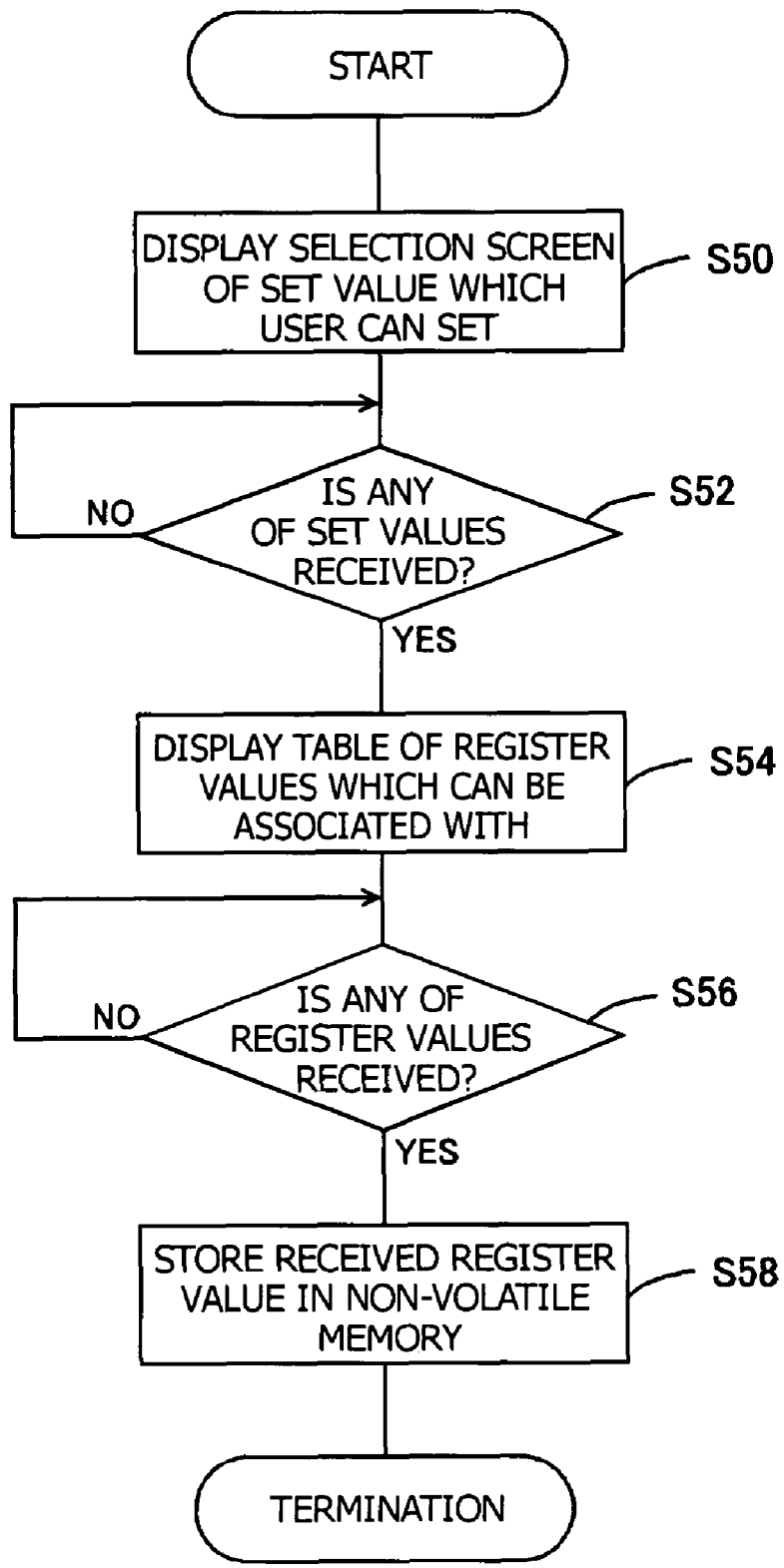
FIG. 6 is an exemplary flow chart showing the process of a microcomputer when a user sets a register value into a set value.
Figure 8:
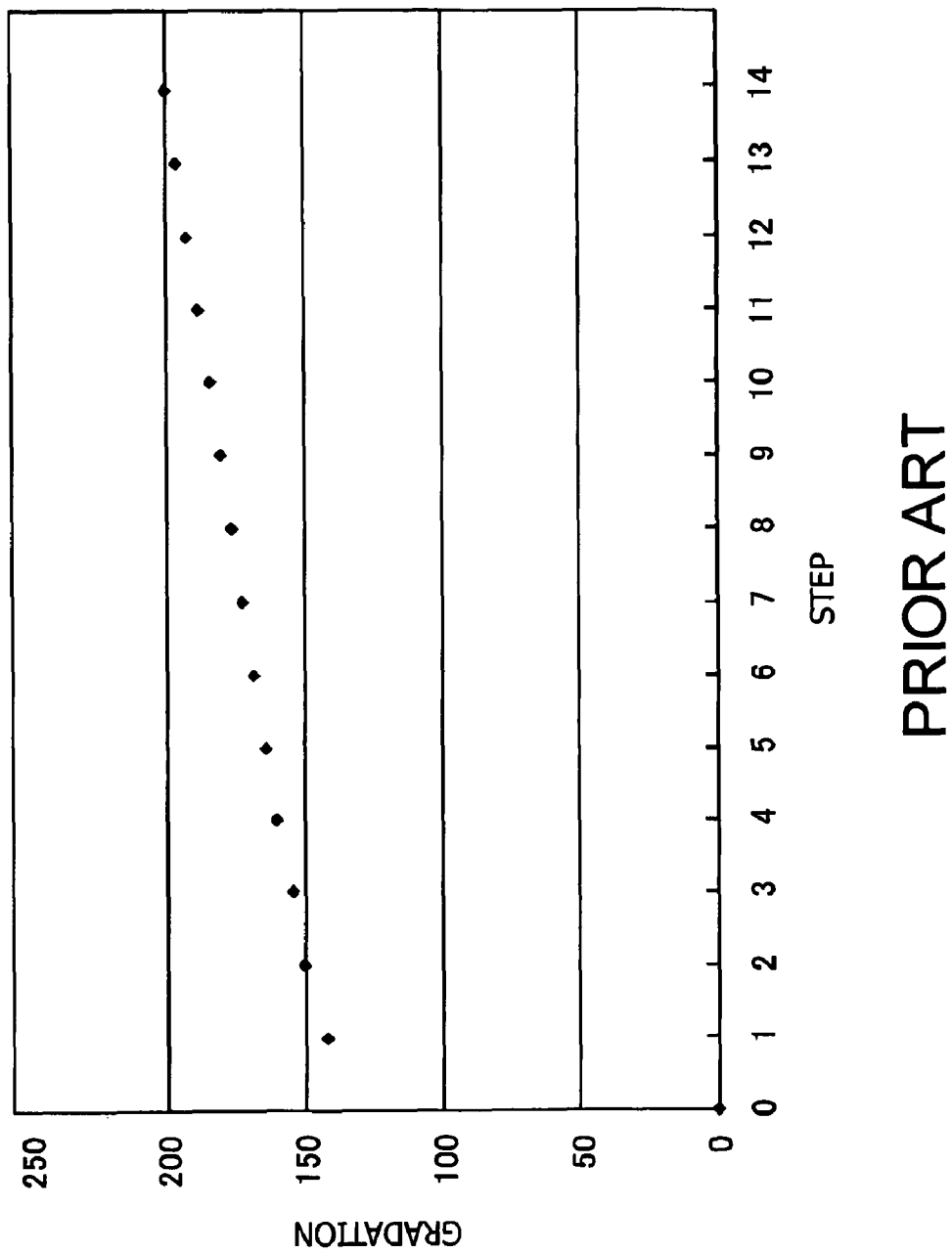
FIG. 8 is an exemplary graph of the lookup table in FIG. 7.

The following is a description of the process of the microcomputer 18 to set register values to be associated with any of set values not more than a shipment position to the set-value number 1 according to an operational input by a user, with reference to FIG. 6. In modifications, a description is provided for the case where the register values associated with the set values 1 to 3 are can be changed and set by a user. The processes in FIG. 6 are executed when a user selects operation items to set color saturation from the menu screen for performing various settings.

When the process is started, the set-value number which can be changed by a user is displayed with the cursor pointing to any of the set-value numbers and the process proceeds to step S50. The microcomputer 18 acquires information on a changeable set-value number from the non-volatile memory 20 and causes the OSD superimposing unit 16e to produce OSD signals for OSD-displaying the set-value number with the cursor pointing to any of the set-value numbers and superimpose the produced OSD signals on image data from the scaler 16c. Then, the Tcont 16d drives the LCD 24 based on the image data on which the OSD signals are superimposed to display corresponding picture on the screen of the LCD 24.

At step S52, a determination is made as to whether any of the set values is received. If a set value is received, it is determined that the condition is satisfied and then the process advances to step S54. If the set value is not received, it is determined that the condition is not satisfied and then the step S52 is repeated. At this point, a user can move the cursor, select and input the set-value number displayed with the cursor by depressing and operating the operation key arranged on the remote controller 28. The microcomputer 18 detects a key operation in response to the input of a voltage signal from the remote controller I/F 26 to receive an operational input from the remote controller 28. For example, when the microcomputer 18 detects the operation of the cursor moving key, the microcomputer 18 causes the OSD superimposing unit 16e to produce OSD signals which move the display position of the cursor and superimpose the OSD signals on image data to repeat the step S52. When the microcomputer 18 detects the operation of the cursor selection key, the microcomputer 18 receives the set-value number displayed with the cursor to proceed to step S54.

At step S54, the microcomputer 18 causes the LCD to display a list of register values which can be associated with the set values received at step S52 with the cursor displayed with the currently associated register values and the process advances to step S56. The microcomputer 18 first gains the register values associated with the present set values and a list of the register values which can be associated from the non-volatile memory 20. The microcomputer 18 then causes the OSD superimposing unit 16e to produce OSD signals for OSD-displaying the list of the register values and the cursor displayed with the register values associated with the present set values in the list, superimpose the produced OSD signals on the image data from the scaler 16c and supply the image data on which the OSD signals are superimposed to the Tcont 16d. Then, the Tcont 16d drives the LCD 24 based on the image data on which the OSD signals are superimposed to display corresponding picture on the screen of the LCD 24.

At step S56, a determination is made as to whether any of the register values is received. If a register value is received, it is determined that the condition is satisfied and then the process advances to step S58. If a register value is not received, it is determined that the condition is not satisfied and then the step S56 is repeated. At this point, a user can move the cursor, select and input the set-value number displayed with the cursor by depressing and operating the operation key arranged on the remote controller 28. The microcomputer 18 detects a key operation in response to the input of a voltage signal from the remote controller I/F 26 to receive an operational input from the remote controller 28. For example, when the microcomputer 18 detects the operation of the cursor moving key, the microcomputer 18 causes the OSD superimposing unit 16e to produce OSD signals which move the display position of the cursor and superimpose the OSD signals on image data to repeat the step S56. When the microcomputer 18 detects the operation of the cursor selection key, the microcomputer 18 receives the set-value number displayed with the cursor to proceed to step S58.

At step S58, the register value received at step S56 is stored in a position of the lookup table 20a corresponding to the set-value number received at step S52 and the process is terminated.

The above processes set a color saturation suiting users' taste into set values 1 to 3 in the lookup table 20a. Selecting the set value on the adjustment screen of color saturation sets the register value into the register 22 to display pictures with color saturation suiting users' taste. The microcomputer 18 executing the processes at steps S50 to S58 forms color saturation receiving unit.

(4) Conclusion

As described above, the register values associated with a set value of four or more are increased approximately proportional to the increase in a set value and the register values associated with set values less than four are gradually lowered to the minimum value of zero by the formula represented by $x \times (b-0)/c$ (where, x is a set value and the register value at a set value of four is taken to be 160). A register value associated with a set value selected by a user is set into the register 22 and the video decoder 16b adjusts the color saturation of video signal based on the register value in the register 22.

Thus, an image display device and television are provided which do not cause a user to feel odd even if set values in the register are shifted between the minimum value and one step before the minimum value with generally preferred color density maintained and meet the taste of users who are fond of picture quality with a light color.

The present invention addresses the provision of an image display device and television which do not cause a user to feel odd even if set values of a register are shifted between the minimum value and one step before the minimum value with generally preferred color density maintained and suits taste of users who are fond of picture quality with a light color.

One aspect of the present invention provides an image display device having a lookup table specifying a corresponding relationship between color saturation represented by gradation and set values associated with part including the minimum value of the color saturation, subjecting input video signals to color correction based on set color saturation and displaying images subjected to the color correction on a screen, the image display device includes a first color saturation setting unit for setting color saturation associated with the set value greater than or equal to a predetermined value based on the lookup table and a second color saturation setting unit for setting color saturation associated with the set value less than the predetermined value by a formula calculating values which gradually decreased to the minimum value of the color saturation as the set value decreases.

According to this configuration, the first color saturation sets color saturation associated with the set value greater than or equal to the predetermined value based on the lookup table and the second color saturation sets the values calculated by the formula as color saturation associated with the set value less than the predetermined value. The formula calculates values which gradually decreased to the minimum value of the color saturation as the set values decreases.

Associating color saturation gradually lowering to the minimum value with a set value less than a predetermined value broadly and smoothly changes color saturation as the set value lowers and provides natural color fade-out. In addition, color saturation is broadly set to enable the set value to be evenly associated with a low color saturation, which allows suiting taste of users who are fond of a low color saturation.

According to the present invention, there is provided a video display device capable of broadly and smoothly changing color saturation as the set value lowers and providing natural color fade-out by associating color saturation gradually lowering to the minimum value with a set value less than a predetermined value. In addition, color saturation is broadly set to enable the set value to be evenly associated with a low color saturation, which allows suiting taste of users who are fond of a low color saturation.

An optional aspect of the present invention provides the lookup table may be formed in such a manner that color saturation is associated with the set value greater than or equal to a predetermined value to increase approximately proportional to the increase in the set value. This configuration associates color saturation greater than or equal to color saturation associated with a predetermined value with a set value greater than or equal to a predetermined value at equally spaced intervals, so that the change of color saturation is constant as a set value changes, providing natural change in color saturation.

According to this aspect of the present invention, the change of color saturation is constant as a set value changes, providing natural change in color saturation.

Another optional aspect of the present invention provides the color saturation is set in accordance with:

$$x \times (b-a)/c$$

where, x represents the set value, a represents the minimum value of the color saturation, b represents color saturation associated with the set value of the predetermined value, and c represents a number of set values from the predetermined value to the minimum value of the set values. This configuration associates color saturation not more than color saturation associated with a predetermined value with a set value less than a predetermined value at equally spaced intervals, so that the change of color saturation is constant as a set value changes, realizing a natural color fade-out.

According to this aspect of the present invention, the change of color saturation is constant as a set value changes, realizing a natural color fade-out.

Another optional aspect of the present invention provides the predetermined value may be selected so that difference between color saturations calculated from adjacent set values in the formula is not more than the predetermined amount. This configuration enables natural color fade-out to be provided.

According to this aspect of the present invention, a more natural color fade-out is provided.

The predetermined value is selected so that difference between color saturations of the set values is not more than the predetermined amount. The predetermined value refers to amount of change which does not cause a user to feel odd when images are displayed on a screen while set values are being changed. For example, if difference between color saturations of adjacent set values greater than or equal to a predetermined value is four, difference between color saturations of adjacent set values not more than a predetermined value is set to 40 or less so that it is not larger by an order or more of magnitude than difference between color saturations of adjacent set values greater than or equal to a predetermined value.

The adjacent set value refers to a set value in which associated color saturations are the closest to each other. In general, color saturation is associated with a set value in ascending order or in descending order, so that numbers attached to set values are preferably adjacent. The phrase "approximately proportional" means that a proportional relationship is deduced by approximation and the degree of color saturation associated with set values is not replaced. That is to say, if color saturations associated with set values A and B are a and b respectively, and if A>B, a>b.

Another optional aspect of the present invention provides in an image display device having a lookup table specifying a corresponding relationship between color saturation represented by gradation and set values associated with part including the minimum value of the color saturation, subjecting input video signals to color correction based on set color saturation and displaying images subjected to the color correction on a screen, the image display device may include a first color saturation setting unit for setting color saturation associated with the set value based on the lookup table, wherein the lookup table is created in such a manner that color saturation is associated with the set value greater than or equal to a predetermined value to increase approximately proportional to the increase in the set value and color saturation is associated with the set value less than the predetermined value by calculated results of the formula represented by:

$$x \times (b-a)/c$$

where, x represents the set value, a represents the minimum value, b represents color saturation associated with the set value of the predetermined value, and c represents a number of set values from the predetermined value to the minimum value of the set value.

According to the configuration, color saturation providing natural color fade-out is set into the lookup table to eliminate the need for storage area for the formula and the process for the above calculation to improve processes and reduce and effectively use the storage area.

According to this aspect of the present invention, processes are improved and the storage area is reduced and effectively used.

Another optional aspect of the present invention provides in an image display device having a lookup table specifying a corresponding relationship between color saturation represented by gradation and set values associated with a part including a minimum value of the color saturation, subjecting input video signals to color correction based on set color saturation and displaying images subjected to the color correction on a screen, wherein the lookup table is created in such a manner that color saturation is associated with set values greater than or equal to a predetermined value among the set values to increase approximately proportional to the increase in the set value, and the image display device may include a color saturation receiving unit for receiving color saturation associated with set values less than the predetermined value to set the color saturation into the lookup table and a first color saturation setting unit for setting color saturation associated with the set value based on the lookup table.

According to the configuration, the color saturation receiving unit receives color saturation associated with set values less than the predetermined value to set it into the lookup table, enabling color saturation to be associated with an arbitrary set value less than the predetermined value to allow a user to create a lookup table suiting its taste, thereby adapting a wide variety of tastes for users.

According to this aspect of the present invention, the setting of users' tastes can be reflected in set values less than the predetermined value to adapt a wide variety of users' tastes.

Another optional aspect of the present invention provides the predetermined value may be not more than a set value in shipment. The set value in shipment refers to a value which is set when a video display device is shipped and into which color saturation which the most users are generally fond of is set. Only set values less than the set value in shipment are gradually lowered or enabled to be set by users to provide natural color fade-out and suit taste of users who are fond of a low color saturation, thereby enabling to use color saturation that the most users are fond of.

According to this aspect of the present invention, a natural color fade-out can be provided and taste of users who are fond of a low color saturation can be met, thereby enabling to use color saturation that the most users are fond of.

Another optional aspect of the present invention provides color saturation associated with the set value is set with the color saturation offset according to models or destinations. According to the configuration, if there are a variety of models and destinations, the lookup table and software for performing control based on the lookup table can be made common, leading to cost reduction.

According to this aspect of the present invention, the lookup table and software are made common, leading to cost reduction.

Another optional aspect of the present invention provides the present invention is suited for the case where color saturation associated with a set value greater than or equal to the predetermined value is unevenly distributed above an intermediate value between the maximum and the minimum value. In other words, color saturation associated with the set value is unevenly distributed above an intermediate value between the maximum and the minimum value and the color saturation can be associated with the minimum value thereof, so that a large gap between the minimum value of the color saturation and other color saturations is produced, however, this gap causes color saturation to be smoothly changed to the minimum, providing a natural color fade-out.

According to this aspect of the present invention, a natural color fade-out can be provided.

As an example of configuration, in a television having a lookup table specifying a corresponding relationship between adjustment values associated one to one with gradations representing color saturation and set values associated with the intermediate value or more and the minimum value of the adjustment values and subjecting input video signals to color correction based on color saturation associated with the set adjustment value, the television includes a tuner receiving a television broadcast signal through an antenna to output a video signal, an A/D converting unit converting the video signal input from the tuner into a digital signal and outputting the digital video signal, a register into which the adjustment values are set, a video decoder subjecting the video signals input from the A/D converting unit to color correction based on the adjustment values set into the register, a scaler causing a number of pixels of a video signal to coincide with a number of pixels of a screen, a display formed by arranging pixels and displaying images on a screen by driving the pixels, a nonvolatile memory in which the lookup table is stored, a remote controller receiving inputs for selecting the set values, and a microcomputer setting adjustment values associated with the set values received by the remote controller into the register, wherein the lookup table associates adjustment values associated with a set value greater than or equal to a predetermined value among the set values so that the adjustment values are increased approximately proportional to an increase in the set value, and the lookup table associates adjustment values associated with a set value less than the predetermined value among the set values so that the adjustment values are gradually decreased to the minimum value of the adjustment value as the set value decreases in accordance with:

$$x \times (b-a)/c$$

where, x represents the set value, a represents the minimum value of the adjustment value, b represents the adjustment values associated with the set value of the predetermined value, and c represents a number of set values from the predetermined value to the minimum value of the set value.

It is to be understood that the specific configuration as in this aspect serves the same operation as the inventions according to the above aspect.

It is to be understood that the present invention is not limited to the above embodiments. Those skilled in the art will readily appreciate that the following are disclosed as an example of the present invention:

members and configuration which can be replaced with each other disclosed in the above embodiments are properly changed in combination and applied;

members and configuration which are not disclosed in the above embodiments but are publicly known art and can be mutually replaced with members and configuration disclosed in the above embodiments are properly replaced or changed in combination and applied; and members and configuration which are not disclosed in the above embodiments but those skilled in the art can assume to be substitutes for the members and configuration which are disclosed in the above embodiments based on publicly known art are properly replaced or changed in combination and applied.

Although the invention has been described in considerable detail in language specific to structural features and or method acts, it is to be understood that the invention defined in the appended claims is not necessarily limited to the specific features or acts described. Rather, the specific features and acts are disclosed as preferred forms of implementing the claimed invention. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, proximal, distal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) is not used to show a serial or numerical limitation but instead is used to distinguish or identify the various members of the group.

What is claimed is:

1. A television, comprising:
a tuner receiving a television broadcast signal through an antenna to output a video signal;
an Analog to Digital (A/D) converting unit converting the video signal input from the tuner into digital video signals and outputting the digital video signals;
a non-volatile memory storing a lookup table that associates adjustment values with set values so that
if the set values are greater than or equal to a predetermined value, the adjustment values are increased approximately proportional to an increase in the set values, and
if the set values are less than the predetermined value, the adjustment values are gradually decreased to the minimum value of the adjustment value as the set values decreases in accordance with:

$$x \times (b-a)/c$$

where, x represents the set values, a represents the minimum value of the adjustment values, b represents the adjustment values associated with the set value of the predetermined value, and c represents a number of set values from the predetermined value to the minimum value of the set values;
a remote controller receiving inputs for selecting the set values;
a microcomputer acquiring the adjustment values associated with the set values received by the remote controller based on the lookup table and setting the adjustment values into a register;
a video decoder subjecting the digital video signals input from the A/D converting unit to color correction based on the adjustment values set into the register;
a scaler making a number of pixels of the digital video signal coincide with a number of pixels of a screen; and
a display formed by arranging the pixels of the screen and displaying images on the screen by driving the pixels.

2. An image display device, comprising:
a lookup table specifying a corresponding relationship between color saturation represented by gradation and set values associated with a part including a minimum value of the color saturation;
a first color saturation setting unit for setting color saturation associated with set value greater than or equal to a predetermined value based on the lookup table; and
a second color saturation setting unit for setting color saturation associated with set value less than the predetermined value by calculating values which gradually decrease to the minimum value of the color saturation as the set value decreases;
wherein the color saturation associated with the set value less than the predetermined value is set in accordance with:

$$x \times (b-a)/c$$

where, x represents the set value, a represents the minimum value of the color saturation, b represents color saturation associated with the set value of the predetermined value, and c represents a number of set values from the predetermined value to the minimum value of the set value.

3. The image display device according to claim 2, wherein the lookup table is created in such a manner that color saturation is associated with the set value greater than or equal to a predetermined value to increase approximately proportional to increase in the set value.

4. The image display device according to claim 2, wherein the predetermined value is selected so that difference between color saturations calculated from adjacent set values in the formula is not more than predetermined amount.

5. The image display device according to claim 2, wherein the predetermined value is not more than a set value in shipment.

6. The image display device according to claim 2, wherein color saturation associated with the set value is set with the color saturation offset according to models or destinations.

7. The image display device according to claim 2, wherein color saturation associated with set values greater than or equal to the predetermined value in the lookup table is unevenly distributed in values greater than or equal to an intermediate value between the maximum and the minimum value of the color saturation.

8. An image display device, comprising:
a lookup table specifying a corresponding relationship between color saturation represented by gradation and set values associated with a part including a minimum value of the color saturation, and
that is created in such a manner that color saturation is associated with set values greater than or equal to a predetermined value among the set values to increase approximately proportional to increase in the set value,
a color saturation receiving unit for receiving color saturation associated with set values less than the predetermined value to set the color saturation into the lookup table; and
a first color saturation setting unit for setting color saturation associated with the set value based on the lookup table
wherein color saturation associated with the set value is set with the color saturation offset according to models or destinations.

9. The image display device according to claim 8, wherein the predetermined value is not more than a set value in shipment.

10. The image display device according to claim 8, wherein color saturation associated with set values greater than or equal to the predetermined value in the lookup table is unevenly distributed in values greater than or equal to an intermediate value between the maximum and the minimum value of the color saturation.

11. An image display device, comprising:
- a lookup table specifying a corresponding relationship between color saturation represented by gradation and set values associated with a part including a minimum value of the color saturation;
- a first color saturation setting unit for setting color saturation associated with set value greater than or equal to a predetermined value based on the lookup table; and
- a second color saturation setting unit for setting color saturation associated with set value less than the predetermined value by calculating values which gradually decrease to the minimum value of the color saturation as the set value decreases;
- wherein color saturation associated with the set value is set with the color saturation offset according to models or destinations.

12. The image display device according to claim 11, wherein the lookup table is created in such a manner that color saturation is associated with the set value greater than or equal to a predetermined value to increase approximately proportional to increase in the set value.

13. The image display device according to claim 11, wherein the predetermined value is selected so that difference between color saturations calculated from adjacent set values in a formula is not more than predetermined amount.

14. The image display device according to claim 11, wherein the predetermined value is not more than a set value in shipment.

15. The image display device according to claim 11, wherein color saturation associated with set values greater than or equal to the predetermined value in the lookup table is unevenly distributed in values greater than or equal to an intermediate value between the maximum and the minimum value of the color saturation.

* * * * *